Feb. 11, 1947.     R. C. WEBB     2,415,468
FREQUENCY DISCRIMINATOR
Filed Feb. 25, 1943
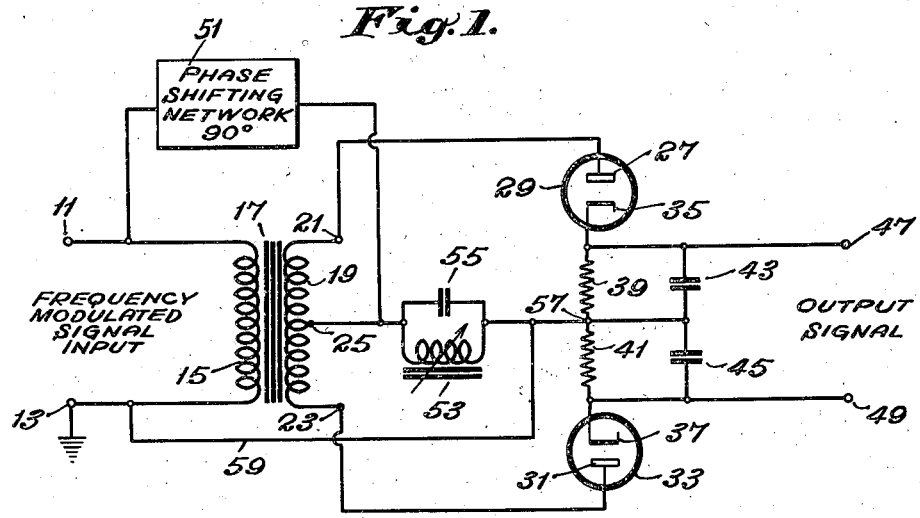
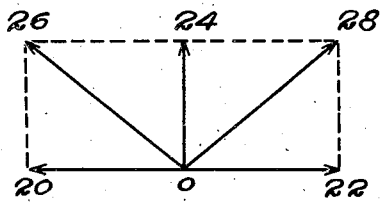
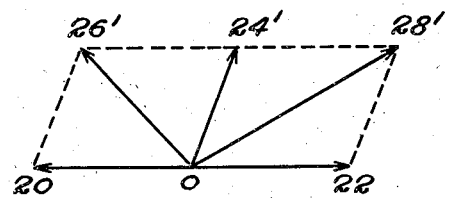
INVENTOR:
Richard C. Webb
by Samuel B. Smith
ATTORNEY.

Patented Feb. 11, 1947

2,415,468

UNITED STATES PATENT OFFICE 2,415,468

FREQUENCY DISCRIMINATOR

Richard C. Webb, La Fayette, Ind., assignor to Purdue Research Foundation, West Lafayette, Ind., a corporation of Indiana Application February 25, 1943, Serial No. 477,074

7 Claims. (Cl. 250—27)

The present invention is directed to electrical circuits and particularly electrical circuits for receiving and detecting frequency modulated or frequency shifted signalling energy.

In its particular form, the invention is directed primarily to the so-called "discriminator networks" used to detect frequency modulated or frequency shifted energy.

In its preferred form, the invention herein to be disclosed comprises a system whereby frequency modulated signal input energy is fed through the usual interstage transformer and then supplied to the plates of two diode elements in opposite phase, and then a phase shifted version of the signalling energy is supplied to the cathode elements of the diodes by way of a phase shifting network and resonant combination comprising an inductance and condenser element connected to form a parallel resonant circuit, with this parallel resonant combination being connected preferably between the center tap of the secondary winding of the interstage coupling transformer and the center tap of the output load resistors from the diodes across which the output energy is derived.

The preferred form of circuit herein to be particularly disclosed and described is one in which special emphasis is placed upon providing operation within the audio frequency band. At the same time, the invention herein to be disclosed contemplates, and has as one of its principal objects, that of providing a steep slope characteristic so that it is possible to operate several completely independent discriminator channels over a single voice frequency communication circuit.

It is a further purpose and object of the present invention to provide a discriminator network which can readily and easily be retuned to a balanced condition as the impressed frequency is varied. An arrangement of this type is particularly important in connection with the control of certain types of devices to which a porportional movement control system is applied.

A system of the type herein to be disclosed, therefore, finds particular application in connection with arrangements of the types for remotely controlling and guiding aircraft and the like, where the receiver discriminator network is placed in the airplane to be guided and which is to be controlled, for instance, from a ground station, so that by shifting or modulated frequency transmitted from the ground station, provision may be made for retuning the circuit to a balanced condition with the change in condition necessary for the retuning being a measure whereby the aircraft may be controlled in either an azimuthal or an altitudinal path.

A system for transmitting control energy of the type herein disclosed has been set forth, for instance, by applications of A. L. G. deBey, Serial No. 369,216, filed December 9, 1940, and Serial No. 471,315, filed January 5, 1943, and reference may be made thereto in connection with the control, for instance.

In a co-pending application filed by me concurrently herewith and entitled "Electrical control apparatus," further reference will be made to a suitable form of control apparatus whereby the retuning effects are automatically achieved and the proportional movement of the control system is readily measured. Such application is further identified as Serial No. 477,075 filed February 25, 1943.

A further object and advantage of the invention is that of providing a system of control where the magnitude of the output voltage changes is made directly proportional to the change in the signal frequency for relatively small frequency changes.

Other objects of the invention are those of providing a discriminator network which is simple in its arrangement and construction, which is highly efficient in its use, which operates within the audio frequency range, and which overcomes, at the same time, one or more known defects of the prior art.

Other objects and advantages of the invention will become apparent and suggest themselves to those skilled in the art when the following specification and its claims are read in connection with the accompanying drawing, wherein, Fig. 1 schematically illustrates one form of circuit for accomplishing the aims and objectives of the invention;

Fig. 2(a) is a vector analysis of one condition of operation when a balance is achieved; and Fig. 2(b) also is a vector analysis of the operation of the circuit when an unbalanced condition occurs.

Referring now to the drawing for a further understanding of the invention, and first to Fig. 1 thereof, the frequency modulated signal energy, after suitable amplification and limiting, if desired, is applied at the input terminals 11 and 13, from which it is supplied to the primary winding 15 of an interstage coupling transformer 17 having a secondary winding 19.

The interstage coupling transformer 17 is preferably of the iron core type and usable primarily within the audio frequency range. The secondary winding 19 of the transformer has outer terminals 21 and 23 which connect respectively to the anodes 27 and 31 of the diodes 29 and 33. The diodes have been shown herein, for convenience, as separate tubes, although it is to be understood that the combination may be embodied within a single tube envelope and be of the general type known as the 6H6.

The secondary winding 19 of the coupling transformer 17 is preferably center tapped at the terminal 25, for reasons which will later be made apparent. The cathodes 35 and 37 of the diode elements 29 and 33 connect respectively to the load resistors 39 and 41, which have the capacity elements 43 and 45 connected across them and to the junction point 57 of the load resistors 39 and 41. In this way, the capacity elements 43 and 45 serve as filter condensers in known manner.

In order to supply energy from the input circuit, which will be out-of-phase by 90°, in a balanced state, with that energy applied to the diodes from the terminals 21 and 23, energy is fed from the input terminal 11, for instance, through the phase shifting network 51 so as to be supplied through the parallel resonant circuit comprising the inductance element 53 and the parallel capacity 55, which parallel resonant circuit connects at one end to the junction point 57 of the load resistors 39 and 41, and, at the other end, to the center tap 25 on the transformer secondary 19.

The phase shifting network 51, in which a phase shift of 90° is introduced in the supplied signal, is of any known form and many such circuits have heretofore been described in the art, and therefore a conventional representation only has been made.

In the operation of the circuit herein disclosed, the signal energy which is applied to the input terminals 11 and 13 is to be transferred now to the diodes 29 and 33.

For purposes of representation, reference may now be had to the vectorial analysis of Figs. 2(a) and 2(b).

In the vector analysis as described, the vector 0—20 will be assumed to represent the voltage applied to the plate 31 of the tube 33, for instance, and thus represents, at one instant, the voltage between the center point 25 and the outer terminal 23 of the transformer secondary, while the voltage represented by the vector 0—22 represents, at like time, the voltage between the center tap 25 and the outer terminal 21 of the transformer secondary, so that this is the voltage applied to the anode 27 of the tube 29. Likewise, the voltage represented by the vector 0—24 represents the voltage across the resonant circuit comprising the parallel inductance 53 and the capacity 55.

The result is that the voltage applied and effective upon the diodes 29 and 33 may be represented by the vector sum of the vectors 0—22 and 0—24 on the one hand, and 0—20 and 0—24 on the other hand for the tubes 33 and 29 respectively, so that the effective voltage applied to the tube 29 is represented now by the vector 0—28 and that applied to the tube 33 is represented by the vector 0—26. These alternating current voltages are then rectified by the diodes and appear as direct current voltages across the load resistors 39 and 41 respectively, as well as across the filter condensers.

In the case illustrated by the vectors of Fig. 2(a), it can be seen that the two voltages 0—28 and 0—26 are equal and the discriminator is considered to be in balance. As the frequency of the impressed energy applied to the terminals 11 and 13 increases, however, the voltage across the tuned circuit, comprising the inductance 53 and the capacity 55, commences to lag from its former position and is now represented by Fig. 2(b) as being the vector 0—24'. Since the voltages in the transformer secondary do not change or alter their positions, these voltages, which were hereinabove described, are still represented by the vectors of Fig. 2(b) as the vectors 0—22 and 0—20. The result is that the voltage 0—28', now effective on the diode 29, is representative of the sum of the voltages 0—22 and 0—24', whereas the voltage effective upon the diode 33 is represented by the sum of the voltages 0—20 and 0—24' so that this voltage now may be represented as the voltage 0—26'.

Accordingly, it becomes evident that the voltage now appearing across the load resistor 39 or across the condenser 43 will be greater than that across the load resistor 41 or the condenser 45, and the difference between these voltages now will be made to appear at the signal output terminals 47 and 49.

When the impressed frequency applied to the input terminals 11 and 13 decreases, the voltage across the tuned circuit, comprising the inductance 53 and the capacity 55, will commence to lead its intermediate position, and the addition of the voltages is now such as to make the direct current voltage across the condenser 45 and the load resistor 41 greater than that across the condenser 43 and the load resistor 39, so that different voltage now appears across the terminals 47 and 49 in reversed polarity, so that if the voltage represented by the vector 0—24' were to lead by an amount equal to the lag shown by Fig. 2(b), it is apparent that the voltage 0—28' applied to the tube 33 would then be equal to that previously applied to the tube 29 and represented by the vector 0—26', while the voltage effective under such circumstances at the tube 29 would then be that which was effective on the tube 33 in the illustrated example.

As was above pointed out, the magnitude of the output voltage which appears across the load resistors is substantially directly proportional to the change in signal frequency for small changes. Also, it should be noted, in connection with apparatus of the type herein disclosed, that in certain types of proportional movement systems it is necessary to adjust the balance frequency of the discriminator continuously over a relatively narrow range of frequencies. This will be particularly true in connection with the automatic control of an aircraft in flight from a remote ground station as indicated, for instance, in the deBey applications hereinabove mentioned.

The circuit herein disclosed, therefore, becomes particularly well adapted to such adjustments, since the resonant circuit comprising the inductance 53 and the condenser 55 may readily be tuned by providing the inductance 53 as a coil surrounding an iron core with provision made for moving the core with respect to the coil or, for instance, by saturating the iron by means of an auxiliary winding carrying an adjustable direct current measured and controlled in accordance with the output signal as derived at the terminals 47 and 49.

In a still further modification of one automatic control for maintaining the discriminator network in a balanced state, reference may be had to my above mentioned co-pending application, Serial No. 477,075.

Various modifications may readily be resorted to without changing either the spirit or scope of this invention, and such modifications of course might readily embody variances in the particular type of phase shifting network 51 which is selected, as well as various ways and means by which the resonant frequency to which the circuit 53—55 is tuned is adjusted.

Other modifications, of course, may be made by the connection of the outer terminals 21 and 23 of the transformer secondary 19 to the cathode elements of the tubes 29 and 33, and then the connection of the load circuit to the tube anodes in contrast to the arrangement of Fig. 1. Still other and further modifications will naturally follow from the scope of the invention as hereinafter set forth by the claims.

Having now described the invention, what is claimed is:

1. A signal detector comprising a pair of thermionic devices each having a plurality of electrode elements, means to energize like electrode elements of said devices with signalling energy 180° out-of-phase relative to each other, means for simultaneously supplying the signalling energy to said electrode elements of each of the tubes in co-phasal manner and normally 90° out-of-phase relative to the other supplied signal energy, phase shifting means including a parallel resonant circuit responsive to frequency changes in the supplied signalling energy to vary the relative phase difference between the two applied signal energies, so that the effect of controlled energy serving to regulate the current flow for each of the tubes is representative of the vector sum of the two controlled energies applied thereto, and a load circuit connected to receive the combined output energy of the said tubes.

2. The detector claimed in claim 1 comprising, in addition, means to vary the parallel resonant phase shift introduced by the phase shifting network to restore the output energies from the said thermionic devices substantially to an equal state.

3. A detector circuit for detecting frequency modulating signal energy comprising a pair of diode elements each having plate and cathode electrodes, means including a transformer secondary for supplying frequency modulated signal energy to the plate electrode elements of each of the tubes in 180° out-of-phase relationship, a connection between the midpoint of the said transformer secondary and the cathode elements of said diodes, said connection including a parallel resonant circuit comprising inductance and capacity elements, means for applying serially with said parallel resonant circuit signal energy in substantially 90° out-of-phase relationship relative to the signalling energy supplied to the plate electrode elements of the said tubes whereby substantially equal load current flows through the said tubes for predetermined equilibrium impressed frequency values, and means for tuning the said parallel resonant circuit to frequencies lying on each side of the said predetermined equilibrium frequency for restoring an equality of output from the said tubes.

4. A detector circuit for detecting frequency modulating signal energy comprising a pair of diode elements each having plate and cathode electrodes, means including a transformer secondary for supplying frequency modulated signal energy to like electrode elements of each of the tubes in 180° out-of-phase relationship, a connection between the midpoint of the said transformer secondary and the other elements of said diodes, said connection including a parallel resonant circuit comprising inductance and capacity elements, means for supplying serially with said parallel resonant circuit signal energy in substantially 90° out-of-phase relationship relative to the signalling energy supplied to the first named electrode elements of the said tubes whereby substantially equal load current flows through the said tubes for predetermined equilibrium impressed frequency values, and means for varying at least one of said capacity and inductance elements for tuning the said parallel resonant circuit to frequencies lying on each side of the said predetermined equilibrium frequency for restoring an equality of output from the said tubes.

5. A detector circuit for detecting frequency modulating signal energy comprising a pair of diode elements each having plate and cathode electrodes, means including a transformer secondary for supplying frequency modulated signal energy to like electrode elements of each of the tubes in 180° out-of-phase relationship, a connection between the midpoint of the said transformer secondary and the other electrode elements of said diodes, said connection including a parallel resonant circuit comprising inductance and capacity elements, means for supplying serially with said parallel resonant circuit signal energy in substantially 90° out-of-phase relationship relative to the signalling energy supplied to the first named electrode elements of the said tubes whereby substantially equal load current flows through the said tubes for predetermined equilibrium impressed frequency values, and means for tuning the said parallel resonant circuit to frequencies lying on each side of the predetermined equilibrium frequency for restoring an equality of output from the said tubes.

6. A signal detector comprising a pair of thermionic devices each having a plurality of electrode elements, means to energize like electrode elements of said devices with signalling energy 180° out-of-phase relative to each other, means for simultaneously supplying the signalling energy to said electrode elements of each of the tubes in co-phasal manner and normally 90° out-of-phase relative to the said first supplied signal energy, a phase shifting network comprising an inductance and capacity element responsive to frequency changes in the supplied signalling energy to vary the relative phase difference between the two supplied signals, so that the effect of controlled energy serving to regulate the current flow for each of the tubes is representative of the vector sum of the two controlled energies supplied to said tubes, and a load circuit connected to receive the combined output energy of the said tubes.

7. The detector claimed in claim 6 comprising, in addition, means to vary one of said capacity and inductance elements to restore a phase shift of substantially 90° between the two supplied signals to restore the output energies from the said thermionic devices substantially to an equal state.

RICHARD C. WEBB.

REFERENCES CITED

The following references are of record in the file of this patent:

UNITED STATES PATENTS

| Number | Name | Date |
|---|---|---|
| 2,282,101 | Tunick | May 5, 1942 |